(12) United States Patent
Paruchuri et al.

(10) Patent No.: US 11,954,139 B2
(45) Date of Patent: Apr. 9, 2024

(54) DEEP DOCUMENT PROCESSING WITH SELF-SUPERVISED LEARNING

(71) Applicant: ACCENTURE GLOBAL SOLUTIONS LIMITED, Dublin (IE)

(72) Inventors: Anwitha Paruchuri, San Jose, CA (US); Guanglei Xiong, Pleasanton, CA (US); Tsunghan Wu, San Jose, CA (US); Neeru Narang, San Jose, CA (US)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 546 days.

(21) Appl. No.: 16/953,037

(22) Filed: Nov. 19, 2020

(65) Prior Publication Data

US 2022/0156300 A1   May 19, 2022

(51) Int. Cl.
| | |
|---|---|
| *G06F 16/35* | (2019.01) |
| *G06F 16/31* | (2019.01) |
| *G06N 3/08* | (2023.01) |
| *G06V 30/413* | (2022.01) |
| *G06V 30/10* | (2022.01) |
| *G06V 30/40* | (2022.01) |

(52) U.S. Cl.
CPC ............ *G06F 16/35* (2019.01); *G06F 16/322* (2019.01); *G06N 3/08* (2013.01); *G06V 30/413* (2022.01); *G06V 30/10* (2022.01); *G06V 30/43* (2022.01)

(58) Field of Classification Search
CPC ......... G06F 16/35; G06F 16/322; G06N 3/08; G06V 30/413; G06V 30/10; G06V 30/43; G06V 30/418; G06V 30/416; G06V 10/82

USPC ......................................................... 715/268
See application file for complete search history.

(56) References Cited

U.S. PATENT DOCUMENTS

| | | | |
|---|---|---|---|
| 6,487,306 B1 * | 11/2002 | Jain .................... | G06V 40/1347 |
| | | | 382/125 |
| 9,043,349 B1 * | 5/2015 | Lin ....................... | G06V 20/62 |
| | | | 704/235 |
| 9,129,340 B1 * | 9/2015 | Medina, III ........... | G06T 7/11 |
| 10,089,390 B2 * | 10/2018 | Ananthanarayanan ...................... |
| | | | G06F 16/355 |
| 10,671,892 B1 | 6/2020 | Daskalov et al. | |

(Continued)

FOREIGN PATENT DOCUMENTS

EP    3712812 A1 *  9/2020  ......... G06K 9/00463

OTHER PUBLICATIONS

Ui.spacer; Sep. 20, 2020; docs.webix.com/api__refs_ui.spacer. html; pp. 1-3.*

(Continued)

*Primary Examiner* — Andrew R Dyer
(74) *Attorney, Agent, or Firm* — Mannava & Kang, P.C.

(57) ABSTRACT

A document processing system processes documents including typewritten and/or handwritten data by converting them to document images for entity extraction. A received document is initially processed to generate a deep document data structured and for classification as one of a structured or an unstructured document. If the document is classified as a structured document, it is processed for entity extraction based on a matching template and image alignment of the document image with the matching template. If the document is classified as an unstructured document, entities are extracted by obtaining nodes and providing the nodes to a self-supervised masked visual language model.

20 Claims, 13 Drawing Sheets

(56) References Cited

U.S. PATENT DOCUMENTS

| | | | |
|---|---|---|---|
| 10,922,358 B2* | 2/2021 | Garg | G06N 5/022 |
| 10,956,673 B1* | 3/2021 | Ramezani | G06V 30/147 |
| 11,393,237 B1* | 7/2022 | Edmund | G06V 30/418 |
| 2007/0047840 A1* | 3/2007 | Xu | G06T 3/0075 |
| | | | 382/294 |
| 2009/0087094 A1 | 4/2009 | Deryagin et al. | |
| 2017/0330375 A1* | 11/2017 | Chen | G06T 7/75 |
| 2018/0011974 A1* | 1/2018 | Schneider | G16H 30/20 |
| 2020/0074169 A1 | 3/2020 | Mukhopadhyay et al. | |
| 2020/0126663 A1 | 4/2020 | Lucas et al. | |
| 2021/0326751 A1* | 10/2021 | Liu | G06N 3/084 |
| 2021/0343030 A1* | 11/2021 | Sagonas | G06T 7/30 |
| 2021/0357644 A1* | 11/2021 | Jain | G06V 10/764 |
| 2021/0375277 A1* | 12/2021 | Lai | G06F 40/30 |
| 2022/0147814 A1* | 5/2022 | Ramezani | G06F 40/284 |
| 2022/0156591 A1* | 5/2022 | Li | G06V 10/82 |
| 2023/0008869 A1* | 1/2023 | Whitestone | G06F 18/2413 |

OTHER PUBLICATIONS

Class Spacer; Aug. 19, 2016; d.umn.edu/-gshute/cs5741/javadoc/gui/Spacer.html; pp. 1-4.*

Structure Spacer; Jun. 17, 2019; developer.apple.com/documentation/swiftui/spacer; pp. 1-17.*

Ankur Singh; End-to-end Masked Language Modeling with BERT; Sep. 18, 2020; keras.io/examples/nlp/masked_language_modeling; pp. 1-12.*

Jiang et al., R2CNN: Rotational Region CNN for Orientation Robust Scene Text Detection; Jun. 30, 2017; arXiv:1706.09579 [cs.CV]; pp. 1-8.*

Yiheng Xu et al., "LayoutLM: Pre-training of Text and Layout for Document Image Understanding", Jun. 16, 2020, (9 pages).

William L. Hamilton et al., "Inductive Representation Learning on Large Graphs", Department of Computer Science, Stanford University, 2017, (19 pages).

Wei et al., "Robust Layout-aware IE for Visually Rich Documents with Pre-trained Language Models", Proceedings of the 43rd International ACM SIGIR Conference on Research and Development in Information Retrieval, Jul. 25, 2020, pp. 2367-2376.

* cited by examiner

DEEP DOCUMENT PROCESSING WITH SELF-SUPERVISED LEARNING

BACKGROUND

Increased usage of digital technologies in various domains has led to the storage and processing of textual and non-textual data. Textual data is provided to computer systems predominantly in the form of documents that may be typed, printed, or otherwise generated by machines. However, the development of fields such as robotic process automation (RPA) for automating business processes requires computers to process documents that also include handwritten inputs such as notes, forms filled in by human handwriting, signatures, etc. When the documents to be processed include printed forms filled with handwritten data, the computer system is required to analyze documents wherein the printed or typewritten input is interspersed with handwritten data.

BRIEF DESCRIPTION OF DRAWINGS

Features of the present disclosure are illustrated by way of examples shown in the following figures. In the following figures, like numerals indicate like elements, in which.

DETAILED DESCRIPTION

Figure 1:
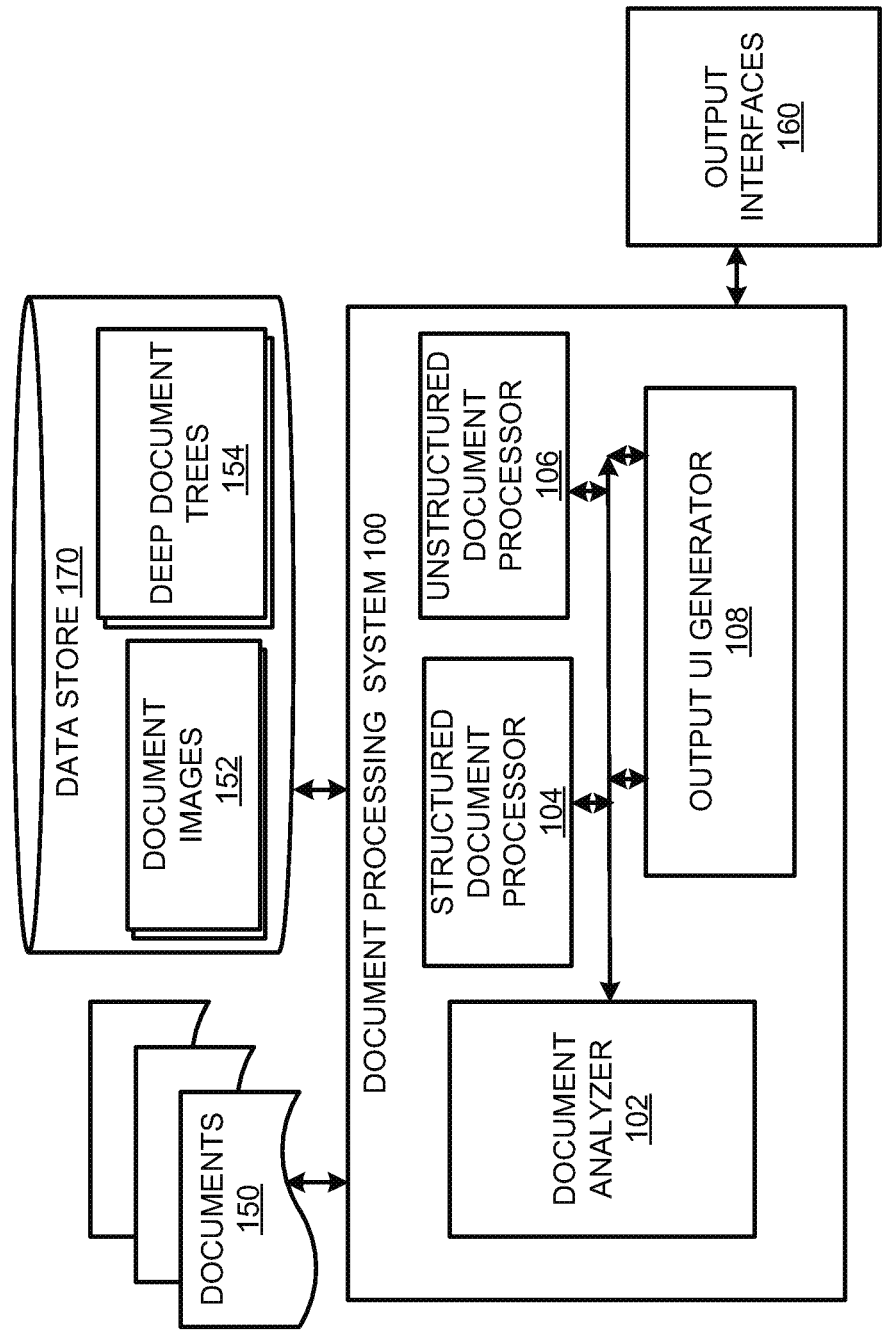
FIG. 1 shows a block diagram of a document processing system in accordance with the examples disclosed herein.

For simplicity and illustrative purposes, the present disclosure is described by referring to examples thereof. In the following description, numerous specific details are set forth in order to provide a thorough understanding of the present disclosure. It will be readily apparent however that the present disclosure may be practiced without limitation to these specific details. In other instances, some methods and structures have not been described in detail so as not to unnecessarily obscure the present disclosure. Throughout the present disclosure, the terms "a" and "an" are intended to denote at least one of a particular element. As used herein, the term "includes" means includes but not limited to, the term "including" means including but not limited to. The term "based on" means based at least in part on.

A document processing system configured to process structured and unstructured documents with handwritten and printed inputs for entity extraction is disclosed. One or more documents that are accessed are initially processed for image generation so that each image corresponds to one of the documents. In an example, the documents can be received as scanned images. The images may be examined to determine image quality. If the Image quality is poor, the images are processed to improve image quality. Each of the documents can be classified as a structured document or an unstructured document using a document classifier wherein the classification is based on identifying a received document as pertaining to a specific document type. Based on the document classification, one of the plurality of Optical Character Recognition (OCR) tools can be employed for extracting data from the documents. Additionally, different objects may be identified from the documents using machine learning (ML) based object recognition models such as deep neural networks (DNN) and the objects may be enclosed with corresponding bounding boxes thereby enabling determining the positions of the objects within the documents. In an example, the textual objects such as textual units with bounding boxes are selected for further processing while the non-textual objects such as images may be discarded from further processing. Deep document data structures that represent the logical structures of the documents are also generated for each of the documents.

The documents are processed differently based on the classification of the documents. If a document is classified as a structured document, a stored template that matches the structured document is identified. A global image registration process is then executed to properly align the image of the document with the image of the matching template. Therefore, misalignment due to one or more of scale, rotation, or translation inconsistencies is compensated for by the global image registration procedure. The key points or points of interest such as corners and edges of predetermined structures and features containing the key points, characteristics in nonlinear scale space invariant to scale rotation, and translation are determined. In an example, the predetermined structures in the document can include but are not limited to text boxes, checkboxes, option buttons, spacers, etc. The features of the document to be processed are matched to the corresponding features of the matching template and the best matching features are selected. The projections for scale, rotation, and translation are estimated based on the best matching features. The document or the document image is then warped on the matching template based on the estimated motion parameters (i.e., scale, rotation, and translation) so that the matching template aligns accurately with the document. Text recognition models are then applied to extract the entity data.

A document classified as an unstructured document, is processed by a self-supervised model, e.g., a masked visual-language model that is pre-trained on a masked data set and subsequently trained on a task-specific data set. In an example, the masked visual language model is provided with the large pre-training data set (e.g., ~10 million) including unlabeled documents. A predetermined small percentage of about 10% of the data in each unlabeled document in the pre-training dataset is randomly masked. The masked documents are converted into images so that each image includes a textual unit or a token with one or more words. The images are provided to the masked visual language model which detects regions of interest and predicts the masked tokens based on the contextual embedding. Besides, the masked visual language model is further trained on a smaller task-specific dataset for further fine-tuning the weights. A graphical representation of the document to be processed by the trained visual language model is initially generated. The graphical representation includes interconnected nodes wherein each node (e.g., a word) is connected to adjacent nodes with edges. The trained visual-language model processes the deep document data structure to set the weights from the text, position, and image data which is then concatenated with the node embeddings from the graphical representation of the document to generate predictions for one or more of the names/values of the entities in the tokens.

With the increasing adoption of digital technology and Artificial Intelligence (AI) based automation, there is a requirement from various domains such as manufacturing, finance, health care, utility, and energy (i.e., oil & gas) to leverage this technology to extract relevant information from documents for a wide range of tasks, OCR is one of many technologies that are used for various process automation procedures such as medical forms digitization, invoice processing, and contract analysis, etc. However, OCR performance suffers due to i) a wide variability in visual aspects and variations in templates from one document to another, ii) poor image quality caused by noise, blurriness, low contrast, rotations, etc. Furthermore, the complexity is increased due to the inter-class similarity with the intra-class variability of various forms. A wide range of documents that differ in terms of structure and content are used hi different processes, Therefore, the simple OCR engine pipeline cannot be used for different documents for information extraction. Manual selection can give humans data from the processed however this is impractical in terms of time, cost, and accuracy as a large volume of documents need to be processed.

While the text-based approaches may process the text in the documents, such approaches are not only language-specific but are also sensitive to text orientation and image quality. Furthermore, template-based methods such as regular expressions cannot be generalized to complex entities. ML model such as conditional random fields (CRF) require a large number (typically greater than 100) of handcrafted features which further necessitates feature selection and customization of feature generation methods for each process. Classic deep learning models used for information extraction such as Bidirectional Long Short Term Memory CRF (BiLSTM-CRF) typically operate on text sequences but do not incorporate visual features of the documents. Furthermore, the models rely on limited labeled data while leaving a large amount of the unlabeled data unused.

The disclosed document processing system overcomes the aforementioned technical challenges by leveraging deep learning-based networks. The documents are initially classified into structured and unstructured documents so that the document annotation can be automatically powered for data extraction. The incorporation of deep learning-based document understanding enabled via the generation of the deep document data structures provides for learning the semantic structure and layout of the documents which are more generalizable across different kinds of documents and complex entities. The output from the OCR tools is supported by representation within a logical tree structure of the given document. The deep learning architecture incorporated within the disclosed document processing system enables collecting not only the textual data but also the position and the image embeddings from the scanned token images obtained from the document. Additionally, the self-supervised learning approach as implemented by the masked visual learning model provides for retraining using several unlabeled documents covering different types and structures. The pre-trained model is then adapted, using a smaller task-specific training data set, to a targeted task of interest such as entity extraction from documents. Furthermore, the generation of graphical representations of unstructured documents enables the document processing system to capture non-local dependencies between the textual units or sentence chunks in a document. The document processing system thus increases the accuracy and efficiency of the information extraction processes.

FIG. 1 shows a block diagram of a document processing system 100 in accordance with the examples disclosed herein. The document processing system 100 includes a document analyzer 102, a structured document processor 104, an unstructured document processor 106, and an output user interface (UI) generator 108. In an example, the document processing system 100 can be coupled to a data store 170 which can be used to store data generated and/or required during the document processing tasks. The document processing system 100 accesses one or more documents 150 which can be in the form of static images i.e., document images 152 or may be converted into the static images wherein each of the document images 152 corresponds to one of the one or more documents 150. The document processing system 100 is configured to classify each document of the one or more documents 150 as a structured document on an unstructured document. Based on the classification, the document is processed either by the structured document processor 104 or the unstructured document processor 106 for information extraction. The extracted information can be provided for validation by the output interfaces 160. In an example, the one or more documents 150 include forms with fields associated with predetermined structures wherein the predetermined structures that are filled with typewritten or handwritten input data to be extracted. In an example, the documents 150 can include plain forms, forms with predetermined structures such as joint/separated frames, different types of checkboxes, option buttons, or forms with spacers. The typewritten on handwritten input data thus extracted is presented via the output user interfaces 160 for validation.

The document analyzer 102 accesses the one or more documents 150 and builds one or more deep document trees 154 with each deep document tree corresponding to one of the one or more documents 150. In an example, the deep document tree can include an extensible markup language (XML) structure that represents the logical structure of the corresponding document wherein the logical structure includes the arrangement of different objects and fields within the document. The document analyzer 102 is further configured to determine the quality of the images to classify the one or ore documents 150 as structured documents or unstructured documents. Based on the quality of the document images 152 and the document classification, a particular document-specific OCR tool is selected by the document analyzer 102 for generating textual units from each of the documents 150.

The structured document processor 104 is configured to access one or more of the documents 150 that are classified as structured documents. In an example, the structured documents can include documents with predetermined logical structures known to the document processing system 100. For example, different templates including blank forms of the various structured documents such as medical forms, tax forms, financial forms, etc., can be stored and made accessible to the structured document processor 104 in order to enable the identification of the structured documents from the received documents. The structured document processor 104 is configured to correct for variations of scale, rotation, translation, etc., of the document images 152 vis-à-vis the stored templates. Trained AI text-recognition models are employed to extract the input data which is included in the forms as machine-produced text or handwritten text.

In addition to known structured documents, the document processing system 100 is configured to extract textual data from unstructured or semi-structured documents having logical structures that are unknown to the document processing system 100. Examples of unstructured or semi-structured documents can include but are not limited to letters, memos, emails, file folders, handwritten notes, financial documents such as balance sheets, budgets, news articles, presentations, scientific publications, questionnaires, resumes, blog entries, or any other document which is not recognized from the stored templates. The unstructured document processor 106 employs the deep document trees generated for the documents 150 in order to obtain visual information such as the objects e.g., images, logos, etc., within the documents 150, formatting information of the text, and layout information such as the arrangement of the objects within the documents 150 required for understanding the documents 150. The text in visually-rich documents cannot be serialized into a one-dimensional sequence without losing important information. Therefore, the unstructured document processor 106 is configured to generate graphical representations from each of the documents 150. Also, a self-supervised ML model is employed for predicting input data e.g., entity extraction, etc., from unlabeled documents.

The fields and their corresponding input data thus extracted from the document images can be populated to the output interfaces 160 for validation by human reviewers. In another example, the input data extracted from the documents 150 can be transmitted to the downstream systems such as robotic process automation (RPA) systems for execution of various automated processes such as but not limited to, automatic invoice processing, automatic contract analysis, automatic claims processing, etc.

Figure 2:
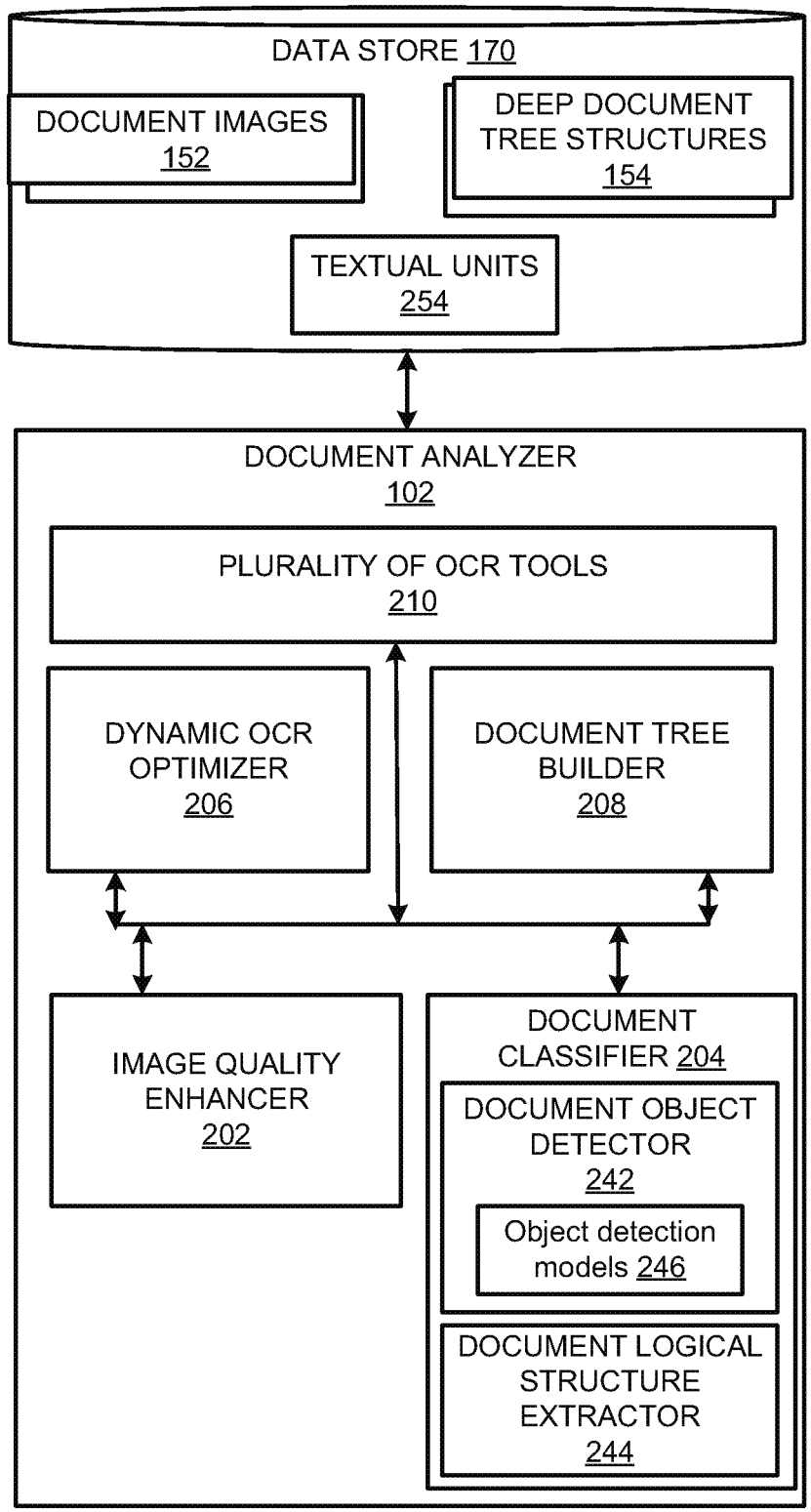
FIG. 2 shows a block diagram of a document analyzer in accordance with examples disclosed herein.

FIG. 2 shows a block diagram of the document analyzer 102 in accordance with examples disclosed herein. The document analyzer 102 includes an image quality enhancer 202, a document classifier 204, dynamic OCR optimizer 206, a document tree builder 208, and a plurality of document-specific OCR tools 210. The image quality enhancer 202 analyzes the document images 152 to determine the quality of each image, Different image attributes such as contrast, clarity, orientation, etc., are identified and their quality is determined based on preset standards. If one or ore of the document images 152 are determined to be of lower quality, the image quality enhancer 202 improves the quality of the low-quality images by increasing the sharpness, improving the contrast, changing the orientation, etc.

The document images 152 are provided to the document classifier 204 for classification of the documents 150 as structured and unstructured documents based on identifying a received document as pertaining to a specific document type. Therefore, a received document can be classified as a health form, contract, invoice, tax form, etc. and the received document can be identified as a structured or unstructured document based on the document type. For example, if a healthcare form is labelled within the document processing system 100 as a structured document and the received document is classified by the document classifier 204 as a healthcare form, then the received document is processed as a structured document. Similarly, if a contract is labelled within the document processing system 100 as an unstructured document and the received document is classified by the document classifier 204 as a contract, then the received document is processed as an unstructured document. Automatic document classification techniques implemented by the document classifier 204 that are used can include but are not limited to one or more of Expectation Maximization (EM), Naíve Bayes classifier, trained neural networks, Latent Semantic Indexing, Support Vector Machines (SVMs), K-nearest neighbor algorithms, decision trees, etc. The document classifier 204 is further configured with a document object detector 242 and a document logical structure extractor 244 to analyze each of the document images 152. The document object detector 242 can include object detection models 246 including deep neural networks (DNNs) trained to detect different objects such as tables, logos, figures, equations, portions of text, etc., from the document images 152. In addition to identifying specific objects, the object detection models 246 are also configured to obtain the bounding box coordinates of each of the detected objects. Each bounding box, therefore, represents a class label classification. Furthermore, the portions of text can also be included at different positions in the document such as a document header, a section or a chapter header, within a sentence, as a caption, etc. Therefore, the context information of the extracted text is also collected by the document classifier 204 based on the bounding boxes of the textual portions. The document logical structure extractor 244 determines the location of each of the objects within the corresponding document image/document based on the bounding box coordinates of the detected objects.

As a result of object detection, portions of the documents 150 that include text can be identified and provided for processing to the OCR tools 210 by the dynamic OCR optimizer 206. Based on the corresponding classification, each of the document images 152 can be provided to one of the OCR tools 210. The OCR tools 210 can include but are not limited to Google® OCR, Tesseract®, Layout OCR, Azure Vision, ABBYY, Amazon Web Services (AWS) OCR, etc. Different OCR tools are configured to extract data from different types of documents. For example, Google OCR works well for contracts whereas other OCR tools may show greater accuracy in data extraction from smart forms, etc. Therefore, classifying the documents 150 and processing the documents 150 by specific OCR tools improves the accuracy of data extraction. The selected OCR tool outputs textual units 254 which can include tokens with at least one word. Again, each of the textual units 254 can be processed by the document logical structure extractor 244 to obtain the bounding box coordinates of each of the textual units 254.

The output from the document classifier 204 and the selected OCR tool which includes the various objects, the bounding box coordinates of the various objects and the textual content of the objects are provided to the document tree builder 208. The document tree builder 208 generates or builds a deep document tree for each of the document images 152/the documents 150. In an example, each of the deep document trees 154 includes a corresponding XML data structure that represents the arrangements of the objects within the document.

Figure 3:
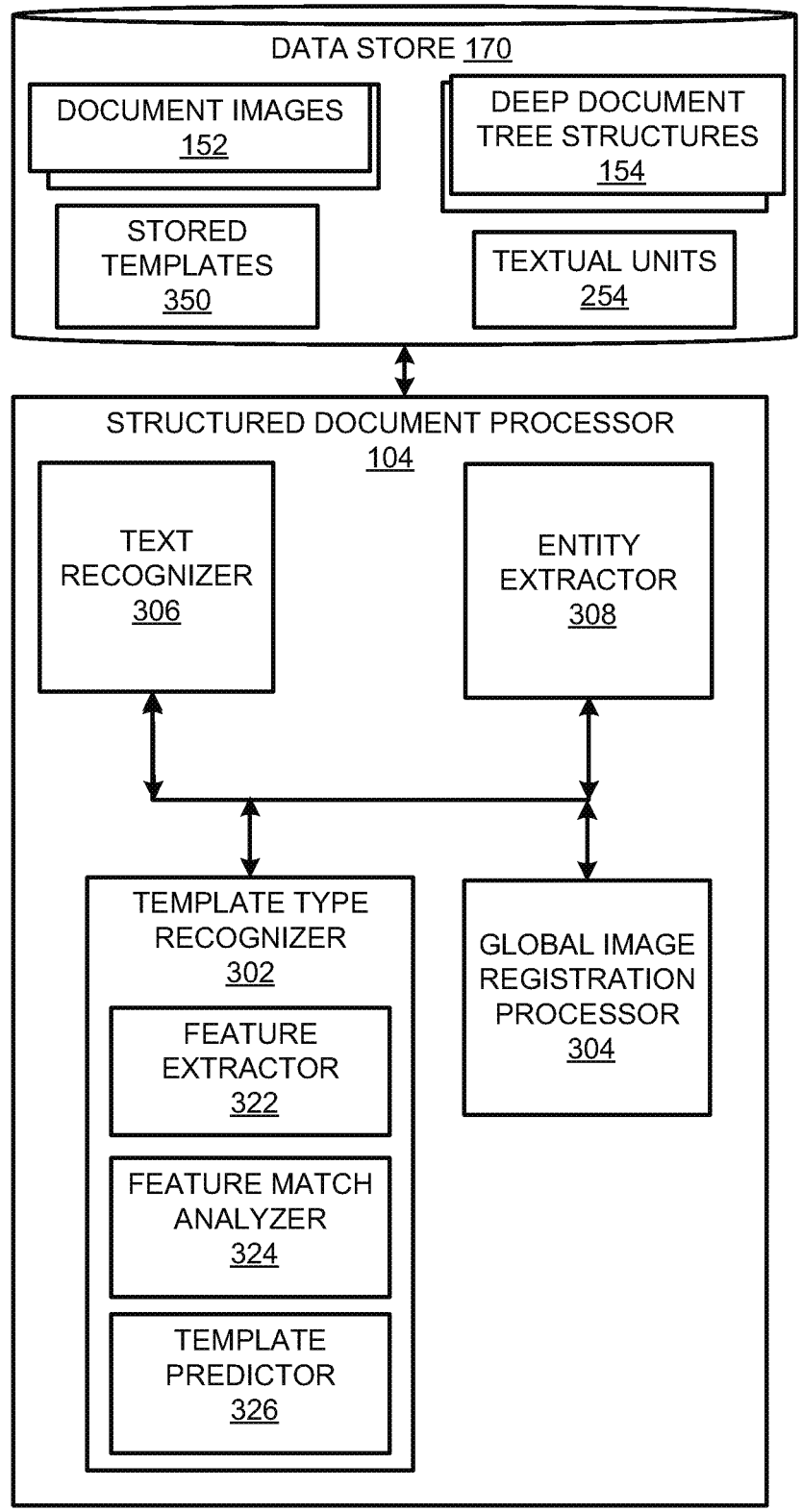
FIG. 3 shows a block diagram of a structured document processor in accordance with examples disclosed herein.

FIG. 3 shows a block diagram of the structured document processor 104 in accordance with examples disclosed herein. The structured document processor 104 includes a template type recognizer 302, a global image registration processor 304, and a text recognizer 306. The template type recognizer 302 accesses a subset of the document images 152 corresponding to the documents identified as structured documents by the document classifier 204. In an example, the template type recognizer 302 may access stored templates 350 of certain documents that pertain to predetermined, standard structures such as health forms, etc., wherein the locations of the fields in the forms can be annotated and stored to enable data extraction from similar forms. Based on a comparison of the document images 152 with stored templates 350 that template type recognizer 302 can identify the documents to be analyzed. In an example, the template type recognizer 302 includes a feature extractor 322, a feature match analyzer 324, and a template predictor 326. The feature extractor 322 can implement Oriented fast and rotated brief (ORB), a fast robust local feature detector for feature extraction. Features can be detected at the texture level and pixel level. The feature match analyzer 324 can be configured to obtain a mean structural similarity index from the texture level features of the subset of document images and the stored templates. Similarly, the feature match analyzer 324 can be configured to estimate the difference scores for the pixel level features of the subset of document images and the stored templates. The template type can be predicted by the template predictor 326 based on the highest voting class.

The global image registration processor 304 enables accurate input data extraction by compensating for or correcting errors that occur in the document production process or the image production process. Documents may be scanned using different sensors, at different scales, from different viewpoints, or at different rotations. As a result, a structured document to be analyzed may not accurately align with the matching stored template. For example, when the top-left coordinates (x1,y1) and bottom-right coordinates (x2, y2) of a stored template are rendered on the corresponding structured document various fields may be misaligned as a result of which accurate data extraction is not possible. This problem can be further exacerbated when the forms include handwritten inputs. The global image registration processor 304 compensates for such misalignments by matching feature estimations of projections needed to align the structured document and the corresponding stored template thereby enabling accurate input data extraction based on the annotated fields associated with the stored templates.

The text recognizer 306 is configured to extract various features and recognize characters and words from the document images 152. The extracted features can include but are not limited to edges, texture, color, thickness, orientation, skewness, size, location, scale, etc., of the text in the structured documents at the character level using models such as Residual Networks (RESNET). In an example, the text recognizer 306 can implement sequence modeling techniques to extract data at word level in different directions (i.e., forwards and backward directions) thereby further enabling determination of the semantic structure of the sentences.

The structured document processor 104 additionally includes an entity extractor 308 to extract entities, for example, as name-value pairs from the documents 150. Models that are trained for printed or typed text can be further trained on images of forms with handwritten input to recognize and extract input data from the structured documents. The entity extractor 308 can further include information extraction (IE) models trained to extract the domain-specific information. For example, in the form relates to the healthcare domain, the text recognizer 306 can include models to identify name-value pairs of entities associated with patient information, diagnosis codes, etc. In an example, the name-value pairs that are extracted can be provided to the output UI generator 108 to provide the entities for validation via one of the output interfaces 160.

Figure 4:
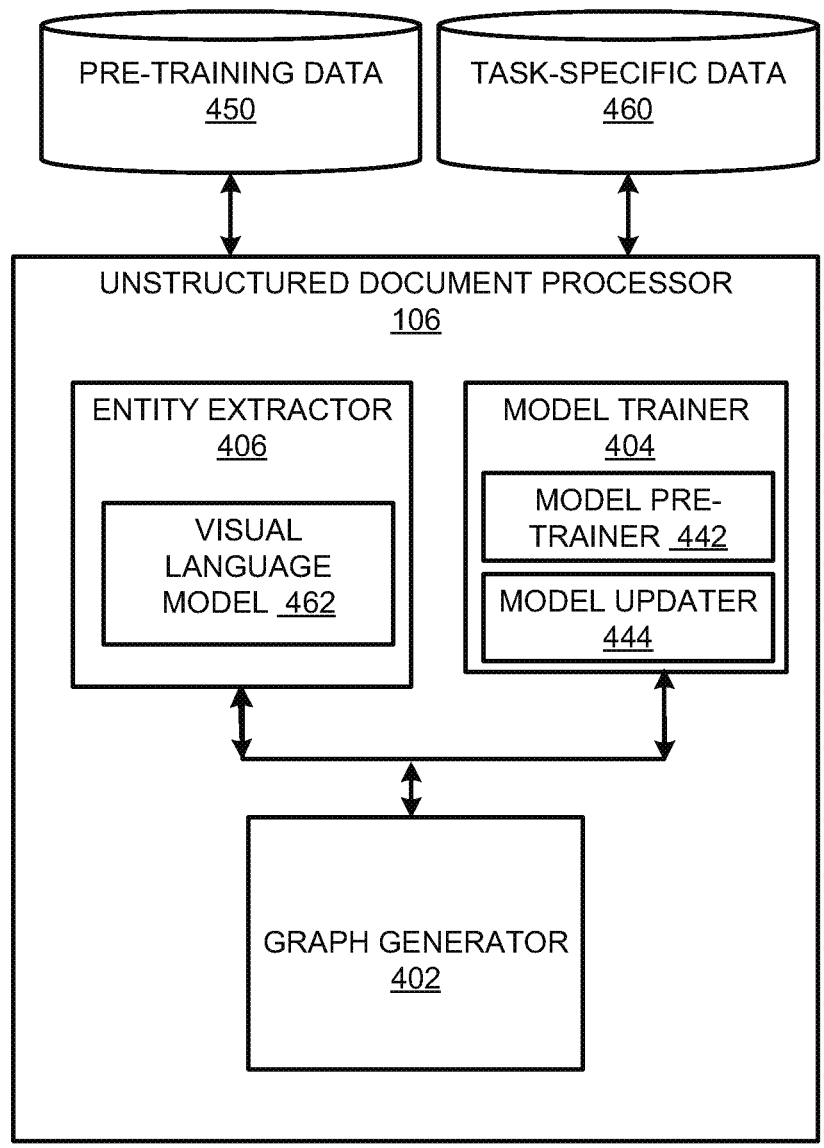
FIG. 4 shows a block diagram of an unstructured document processor in accordance with the examples disclosed herein.

FIG. 4 shows a block diagram of the unstructured document processor 106 in accordance with the examples disclosed herein. The unstructured document processor 106 employs not only the textual information from the unstructured documents but also uses document layout information and visual information for the entity extraction. The unstructured document processor 106 includes a graph generator 402, a model trainer 404, and a self-supervised entity extractor 406. As mentioned above, the unstructured document processor 106 is configured with a graph generator 402 to generate graphical representations for each of the unstructured documents based on the corresponding deep document data structures. In an example, each of the tokens obtained from an unstructured document using the selected OCR tool can be treated as a node with edges connecting the node to adjacent nodes so that each token (or textual unit) can be connected to its four nearest neighbors (e.g., top, bottom, left, right). Therefore, a subset of the documents 150 which includes the unstructured documents can be represented as a block diagonal sparse matrix wherein each element on the diagonal of the matrix can represent an adjacency matrix for one of the unstructured documents in the subset.

The diagonal sparse matrix is provided to the entity extractor 406 for the extraction of input data including the entities. The entity extractor 406 includes a visual language model 462 for the extraction of the entities. In an example, the visual language model 462 has several layers such as image, position, text, etc. One of the layers can include an image embedding layer can implement a Rotational Region Convolution Neural Network (R2CNN) in the entity extraction of unseen documents using pre-training data 450 including un-labeled documents, Self-supervised learning refers to techniques that do not use human-annotated datasets to learn (visual) representations of the data. It is a form of unsupervised learning where the data provides the supervision. In general, some part of the data is withheld and the visual language model 462 is tasked with predicting the obscured data. The task defines a proxy loss, and the visual language model 462 is forced to learn the output to be produced, which, in the present instance can include an order of semantic representation. With respect to images, self-supervised learning enables user networks to predict the relative positions of two regions within the same image. In an example, the visual language model 462 can be pre-trained by a model pre-trainer 442 included in the model trainer 404 using the self-supervision concept on pre-training data 450 including publicly available datasets such as, the Illinois Institute of Technology Complex Document Information Processing Test Collection, version 1.0 (IIT-CDIP Test Collection 1.0), which contains more than 6 million documents, with more than 11 million scanned document images. Each document in the collection has its corresponding text and metadata stored in XML files. The text is the content produced by applying OCR to document images The weights of visual language model 462 can be initialized with the pre-trained Bidirectional Encoder Representations from Transformers (BERT) base model. Alternately, A Lite BERT (ALBERT), A Robustly Optimized BERT Pretraining Approach (RoBERTa), or other models may also be employed for the pre-training. In an example, the architecture of the R2CNN can include a 12-layer transformer with 768 hidden sizes, and 12 attention heads, which contains about 113 million parameters with 2-D position embedding layers and Faster R-CNN Layers. One additional component that is required to make the document understanding holistic is the representation of latent (hidden) relations between the textual units (tokens) in the document. Graph Representations/Networks can be used to learn these representations in additional node embedding layers which can be added during fine-tuning.

The visual language model 462 which has been pre-trained using the self-supervised learning methodology can be further trained by a model updater 444 also included in the model trainer 404 on a smaller task-specific data set 460 for updating the weights for the text, the positions of the text and the images in an end to end manner. In an example, the task-specific data 460 can include unstructured documents that are processed by the document analyzer 102 to generate the corresponding deep document data structures. The deep document data structures generated for the unstructured documents in the task-specific data set can be used to update the weights of the pre-trained model. The pretraining phase enables reducing the amount of data required for the task-specific data sets. After updating the visual language model 462 with the node embeddings for each textual unit are concatenated to the different embeddings associated with the various model's layers to obtain the name-value predictions for each textual unit.

Figure 5:
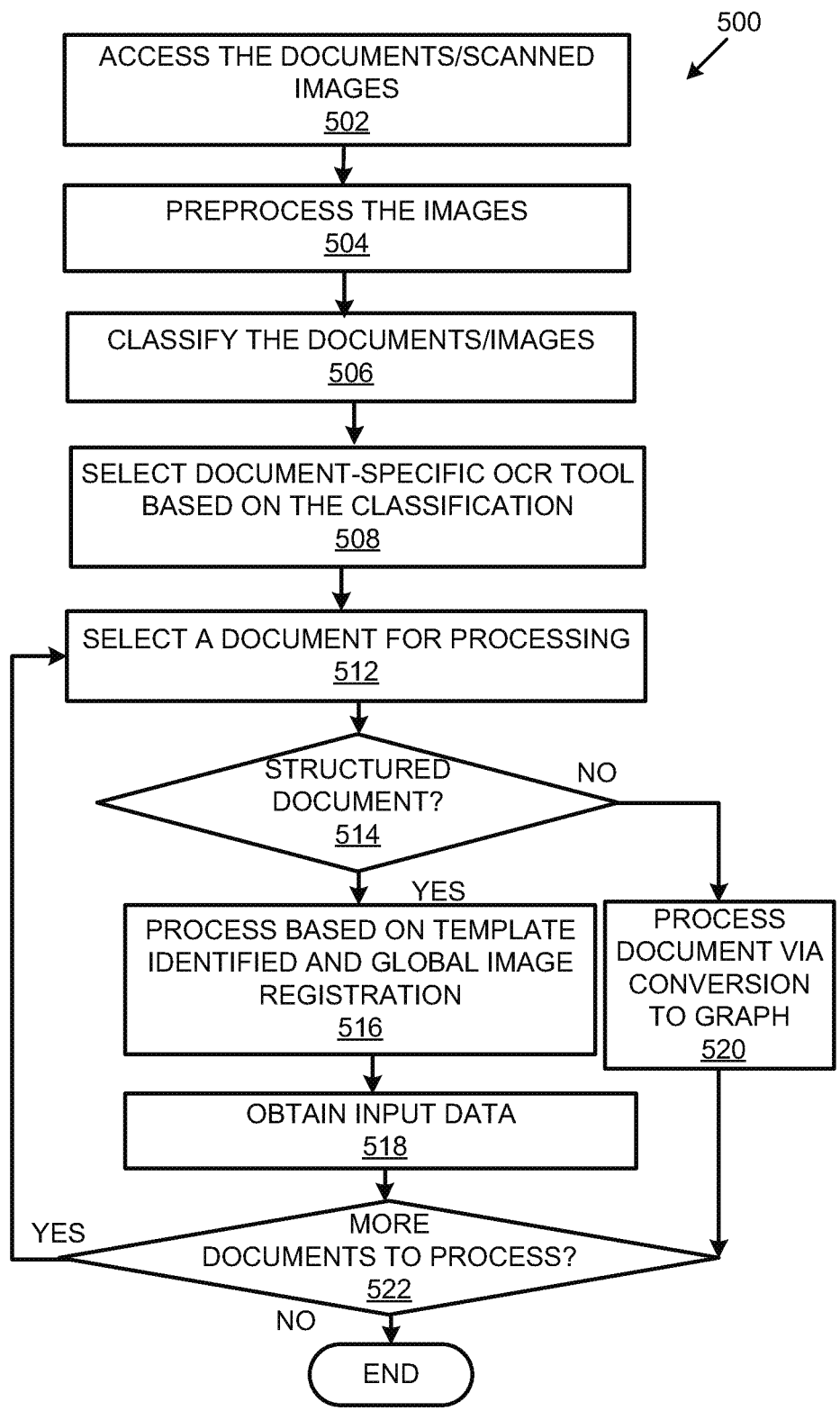
FIG. 5 shows a flowchart that details a method of processing documents in accordance with examples disclosed herein.

FIG. 5 shows a flowchart 500 that details a method of processing structured and unstructured documents in accordance with examples disclosed herein. The method begins at 502 wherein the documents 150 are accessed. The documents 150 can include structured and unstructured documents and may be received via email, accessed from network storage, uploaded by the user, etc. In an example, the structured and unstructured documents can be received as the document images 152 and may include input data of typewritten and/or handwritten text. If one ore of one or more of the documents 150 are not in the form of images, they are initially converted into the document images 152. The document images 152 can be initially preprocessed at 504 to determine image quality and enhance the image quality if any of the document images 152 are of low quality. Upon being preprocessed, each of the document images 152 that correspond to the documents 150 is classified as one of a structured document or an unstructured/semi-structured document at 506. A document-specific OCR tool is selected from the plurality of OCR tools 210 at 508 based on the classification of the document. At 512 one of the documents 150 is selected for processing and it is determined at 514 if the selected document is structured. If it is determined at 514 if the selected document is structured. The process moves to 516 wherein the document is processed based on the identification and global image registration as detailed herein. The input data including entities in the document are obtained at 518.

If it is determined at 514 that the selected document is an unstructured/semi-structured document the method moves to 520 to process the document via conversion to a graph which is further provided to a self-supervised ML model for entity extraction as detailed herein. The method then moves to 518 wherein the input data is obtained. At 522, it is determined if any of the documents 150 remain for processing. If it is determined at 522 that one or more of the documents 150 remain for processing, the method moves to 512 to select the next document. If it is determined at 522 that no further documents remain for processing, the method terminates on the end block. It can be appreciated that the processing of the documents is shown herein as occurring serially for illustration purposes only and that the documents 150 can be processed simultaneously depending on the availability of the processing resources.

Figure 6:
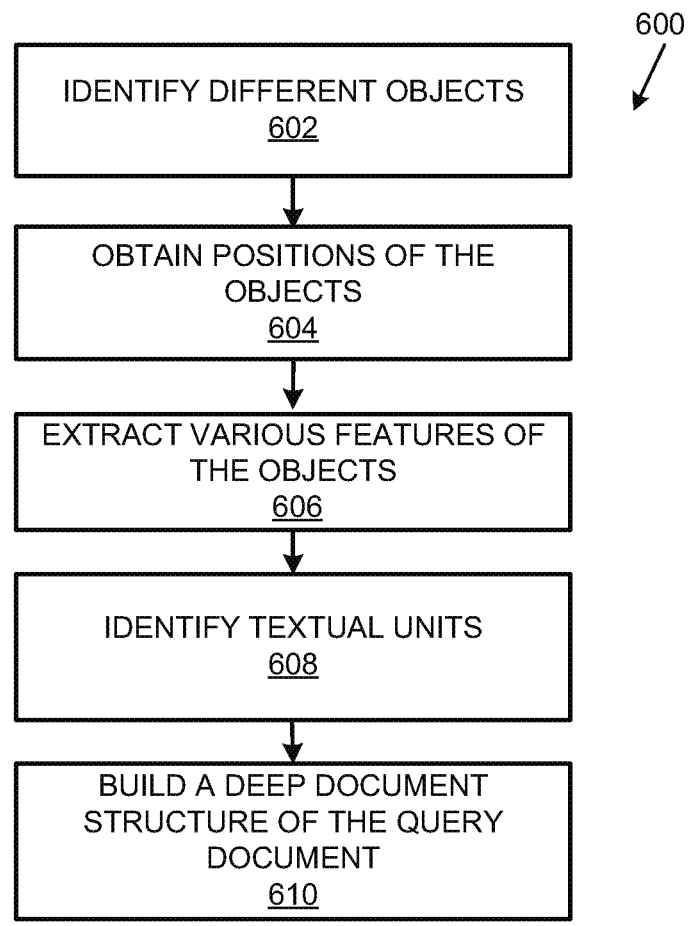
FIG. 6 shows a flowchart that details a method of generating deep document trees in accordance with the examples disclosed herein.

FIG. 6 shows a flowchart that details a method of generating a deep document tree in accordance with the examples disclosed herein. The method begins at 602 wherein different objects such as tables, images, logos, etc., are identified from one of the documents 150 (i.e. a query document/query form/or a query image corresponding to the query document) in addition to chunks of text or textual portions. At 604, the positions or locations of the objects are obtained and the objects can be enclosed within bounding boxes. In an example, trained DNNs can be used for object identification and bounding box generation. The various features of the objects are extracted at 606. If the object is an image of a figure the features can include any textual content included therein, the reference to the object in the textual portions, any semantic meaning associated with the object, etc. are extracted. Similarly, for the textual portions, the titles or captions, chapter or section headings, the status of the text such as whether the textual portion is a section, a paragraph, a sentence, etc., are extracted at 606 and used for building the document logical structure of the query document. The textual units are identified at 608 using bounding boxes, A textual unit (or a token) can include a word or more than one consecutively-occurring words. A deep document tree is built at 610 for the query document using the output from the selected OCR tool and the features extracted at 606. The deep document tree can include an XML structure including not only the textual content of the document but also the information regarding the logical structure of the document, such as the arrangement of various elements like textual portions, images, sections, pages, tables, etc.

Figure 7A:
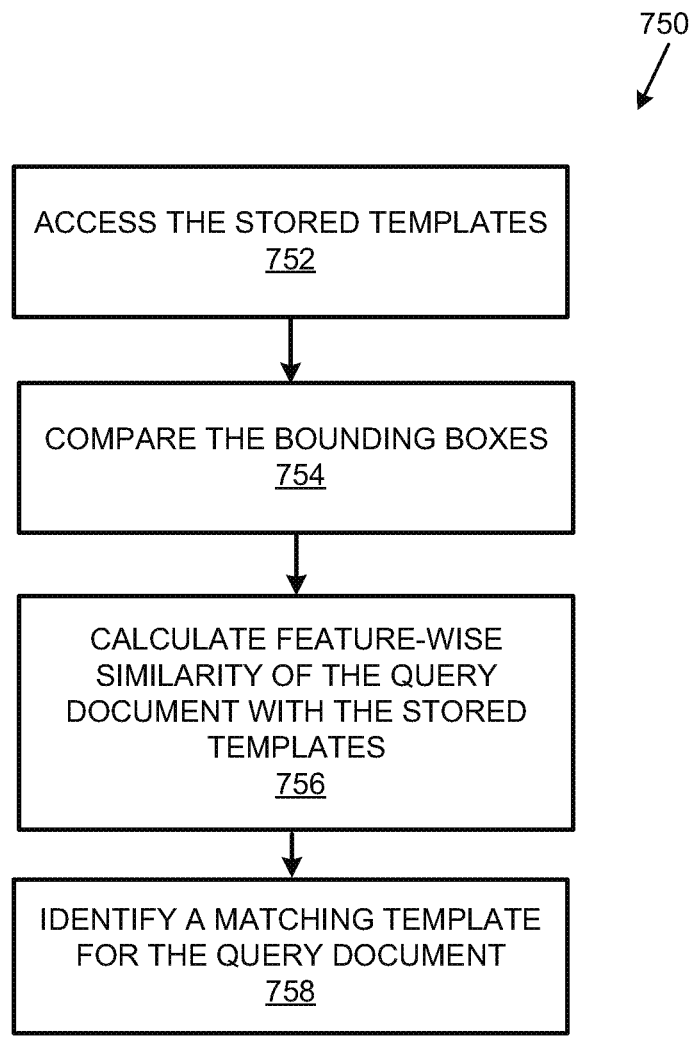
FIG. 7A shows a flowchart that details a method of processing a structured document in accordance with the examples disclosed herein.

FIG. 7A shows a flowchart 750 that details a method of processing a structured document in accordance with the examples disclosed herein. At 752, the stored templates 350 are accessed for comparison purposes. The various bounding boxes of the query document are compared with the bounding boxes of each of the stored templates at 754. In an example, the features of the bounding boxes such as but not limited to, the type of object enclosed by the bounding box, the position of the bounding box within the query document, and the structures of the documents can be compared. At 756, a feature-wise smarty can be calculated to determine the match of the query document with each of the stored templates 350. Techniques such as ORB techniques can be employed to extract texture level features and pixel-level features of the query document. In an example, a mean structural similarity index can be obtained for the texture level features while a difference score is calculated from the pixel-level features. At 758, a template from the stored templates 350 that matches the query document (or query age/query form) is identified. In an example, a stored template having a maximum value of the mean structural similarity index (i.e., max(T1, T2, T3)) and a minimum value of the difference score (i.e., min (T1, T2, T3)) can be obtained from the determination. The maximum and minimum values can be compared with predetermined thresholds to determine if a matching template exists for the query document. For example, in the case of similarity index, the query document is identified as pertaining to a particular template if the similarities are greater than a predetermined similarity threshold and the stored template with the maximum and minimum values is selected as the predicted template type based on the highest voting class.

Figure 7B:
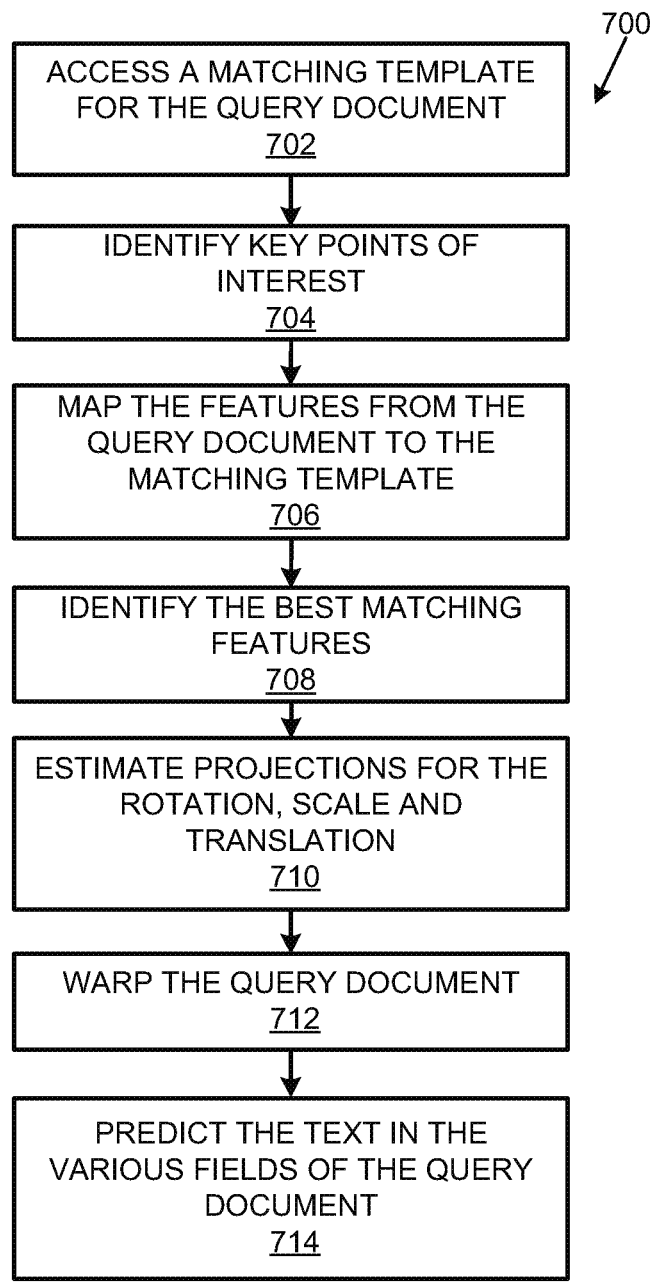
FIG. 7B shows a flowchart that details a method of processing a structured document in accordance with the examples disclosed herein.
Figure 8:
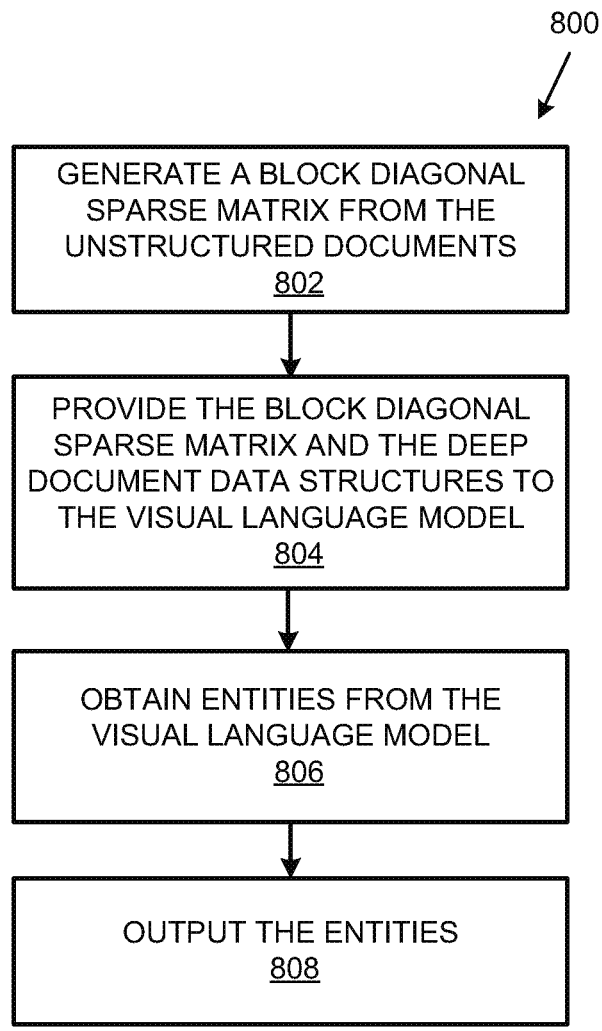
FIG. 8 shows a flowchart that details a method of processing an unstructured document/semi-structured document in accordance with the examples disclosed herein.

FIG. 7B shows a flowchart that details a method of processing a structured document in accordance with the examples disclosed herein. The method begins at 702 with accessing a matching template from the stored templates 250 for a query document classified as a structured document. A global image registration process is executed to properly align the misaligned coordinates thereby enabling accurate input data retrieval. At 704 the key points/points of interest such as corners and edges and descriptors i.e., features containing the key points' essential characteristics are identified in non-linear scale space that is invariant to the scale, rotation, and translation. The features are mapped from the selected template to the query document. For example, the top left (x1, y1) and bottom right (x2, y2) coordinates are selected from the matching template. The same coordinates (x1, y1) and (x2, y2) are rendered to the query document. The features from the query document are mapped to the features of the matching template at 706, In an example, similarity measures can be employed between corresponding features to identify the matches. The best matching features are identified at 708 using techniques such as Brute Force Hamming, etc. The predictions for the rotation, scale, and translation are estimated at 710 for the best matching features. At 712 the query document is warped so that it aligns with the matching template. An ML model trained for text recognition is employed at 714 to predict the text in the various fields of the form (or the query image corresponding to the form) using the input data features such as but not limited to, the edges, texture, color, thickness, orientation, skewness, size, location, scale, etc. In an example, these features can be provided to the fully connected layers of the ML model for text recognition. The input data that is provided in the form such as the name of the person, the person address, medical terms, etc., can be obtained, FIG. 8 shows a flowchart that details a method of processing an unstructured document/semi-structured document in accordance with the examples disclosed herein. The method begins at 802 wherein a block diagonal sparse matrix is generated for a data set including the unstructured documents. Each of the textual units generated from the unstructured documents in the data set by the selected OCR tool can be treated as being connected to a minimum number of neighboring nodes (e.g., four neighboring nodes) via edges. Generating such node embeddings enables learning the latent relationships between the textual units by learning weights of the aggregated function which takes into consideration the feature vector of the neighborhood nodes of depth K, Each node is represented by the feature vector composed of the text, the image, the position embeddings, Each document is converted into a graph that includes the node embeddings. The block diagonal sparse matrix is generated by including the graphs within the diagonal of the block diagonal sparse matrix.

At 804, the block diagonal sparse matrix and the deep document data structures of the unstructured documents in the data set are provided to the visual language model 462 that is pre-trained on masked data for entity extraction. The entities in the form of name-value pairs are obtained at 806 and maybe output at 808 to a user for validation on one of the output user interfaces 160.

Figure 9:
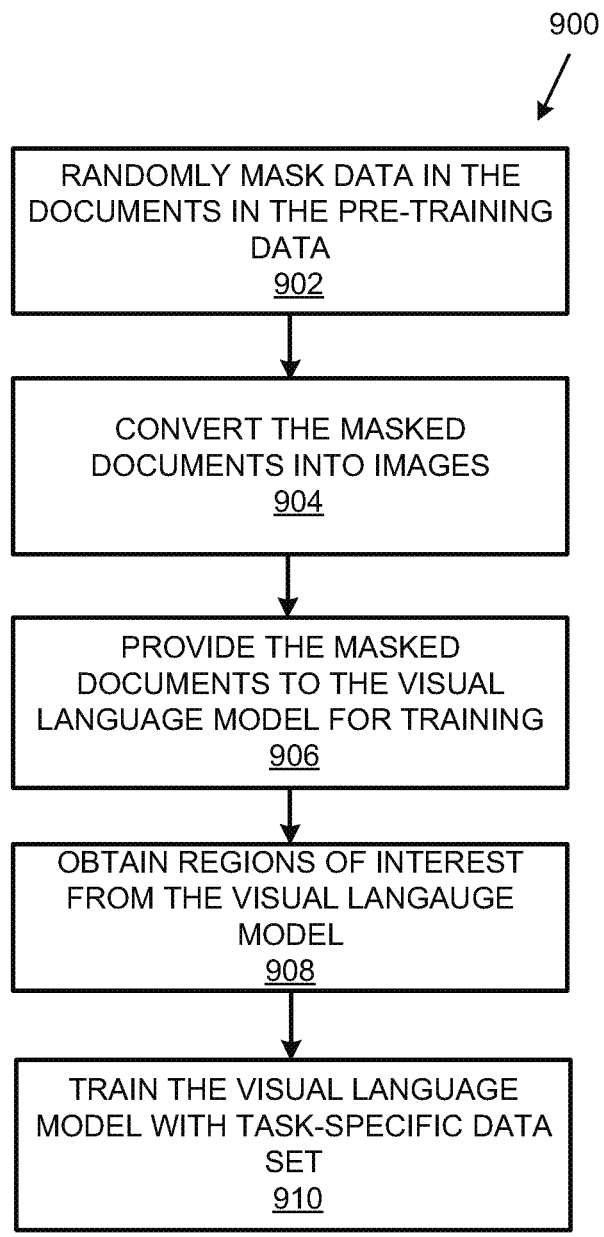
FIG. 9 shows a flowchart that details of a method of training a visual language model in accordance with examples disclosed herein.

FIG. 9 shows a flowchart that details a method of training the visual language model 462 in accordance with examples disclosed herein. In an example, the visual language model 462 can be employed which may include multiple layers such as one or more positional embeddings layers, one or more attention-based transformer text embedding layers, and imaging embedding layers. In an example, a R2CNN architecture is used for the image embedding layers. The method begins at 902 wherein a predetermined fixed percentage of data (e.g., 10%) is randomly masked on the documents in the pre-training data 450. Masking data can include randomly blacking out or otherwise obscuring certain word(s) in different portions of the documents. At 904, the masked documents are initially converted into small images wherein each image includes a textual unit of the masked documents so that a given masked document is converted into many small images. The masked documents are provided to a visual language model for training at 906. The visual language model detects regions of interest on the model documents 908, Therefore, the pre-trained visual language model extracts features of interest for the small images such as the font properties of the text in the textual units e.g., font style, font size, font type, etc. The features for a masked textual unit can be determined based on the contextual embeddings such as features associated with the unmasked textual units in the neighborhood of masked textual unit. As a result, a proxy nonlinear loss function is formulated to train the visual language model 462 on the unlabeled documents hi the pre-training data 450. The visual language model 462 output includes pre-trained weights with higher-level document structure and semantic information embedded therein. At 910, a smaller task-specific dataset with the corresponding deep document data structures generated by the document analyzer 102 can be provided to the pretrained visual language model to update the textual, position, and image weights. When the visual language model 462 is in use for entity extraction, the node embeddings obtained for the unstructured documents from the graph generator 402 are concatenated and passed through a fully connected layer and a SoftMax layer to classify each textual unit with an output label (i.e., the name and/or value of the entity associated with the textual unit).

Figure 10:
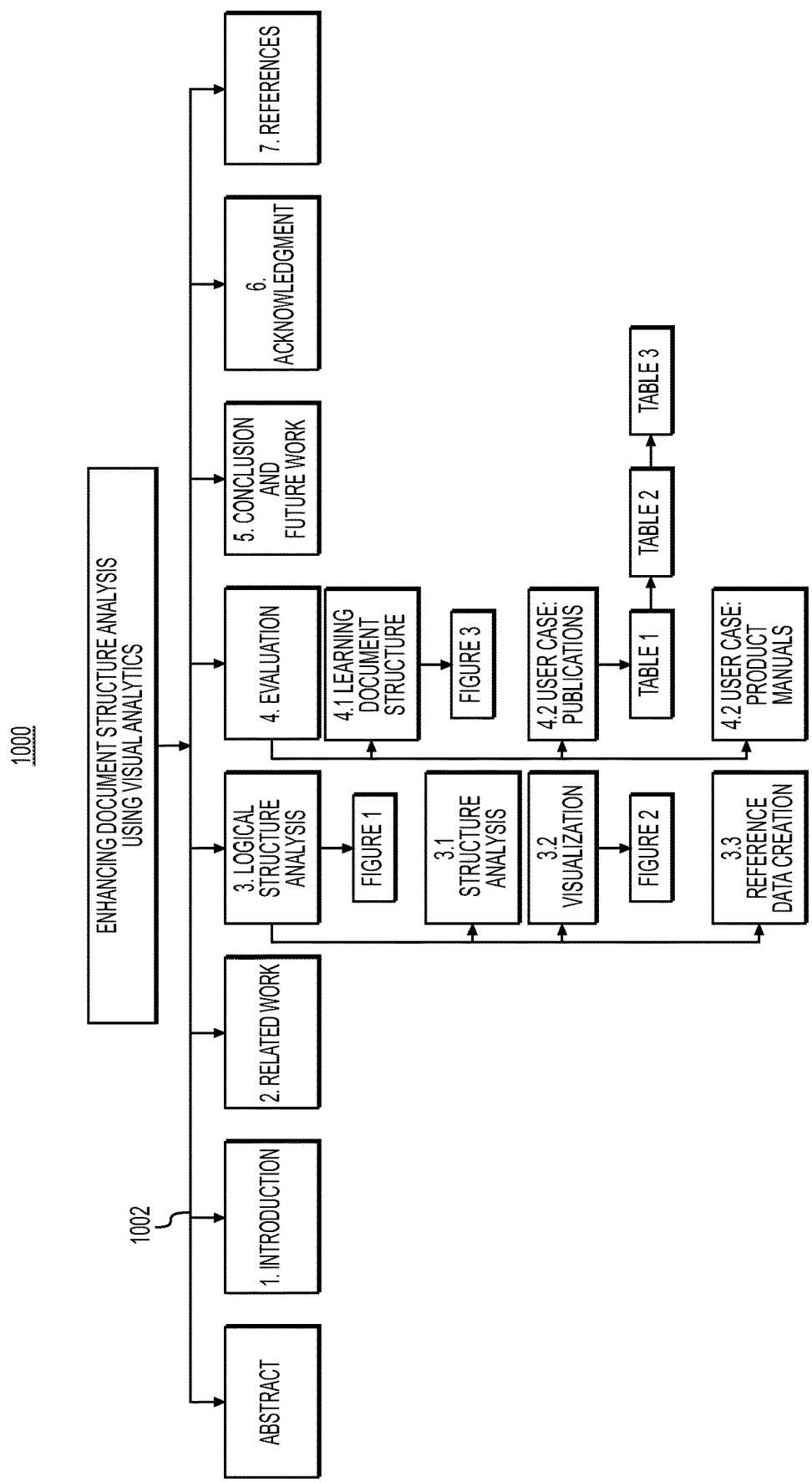
FIG. 10 shows a deep document tree generated in accordance with the examples disclosed herein.

FIG. 10 shows a deep document tree 1000 in accordance with the examples disclosed herein. The deep document tree 1000 can include a XML structure that is representative of the logical structure of a structured or unstructured document. Accordingly, the various sections of the document are included in the first level 1002, the pages associated with the different levels, the sections and sub-sections included in each page along with the tables or other objects are also included. For example, the deep document tree 1000 conveys that the logical structure analysis section includes FIG. 1, a subsection '3.1 Structure Analysis', and another subsection '3.2 Visualization' which further includes FIG. 2. Therefore, not only does the deep document tree 1000 convey the contents of a document but also conveys how the contents are arranged in the document.

Figure 11:
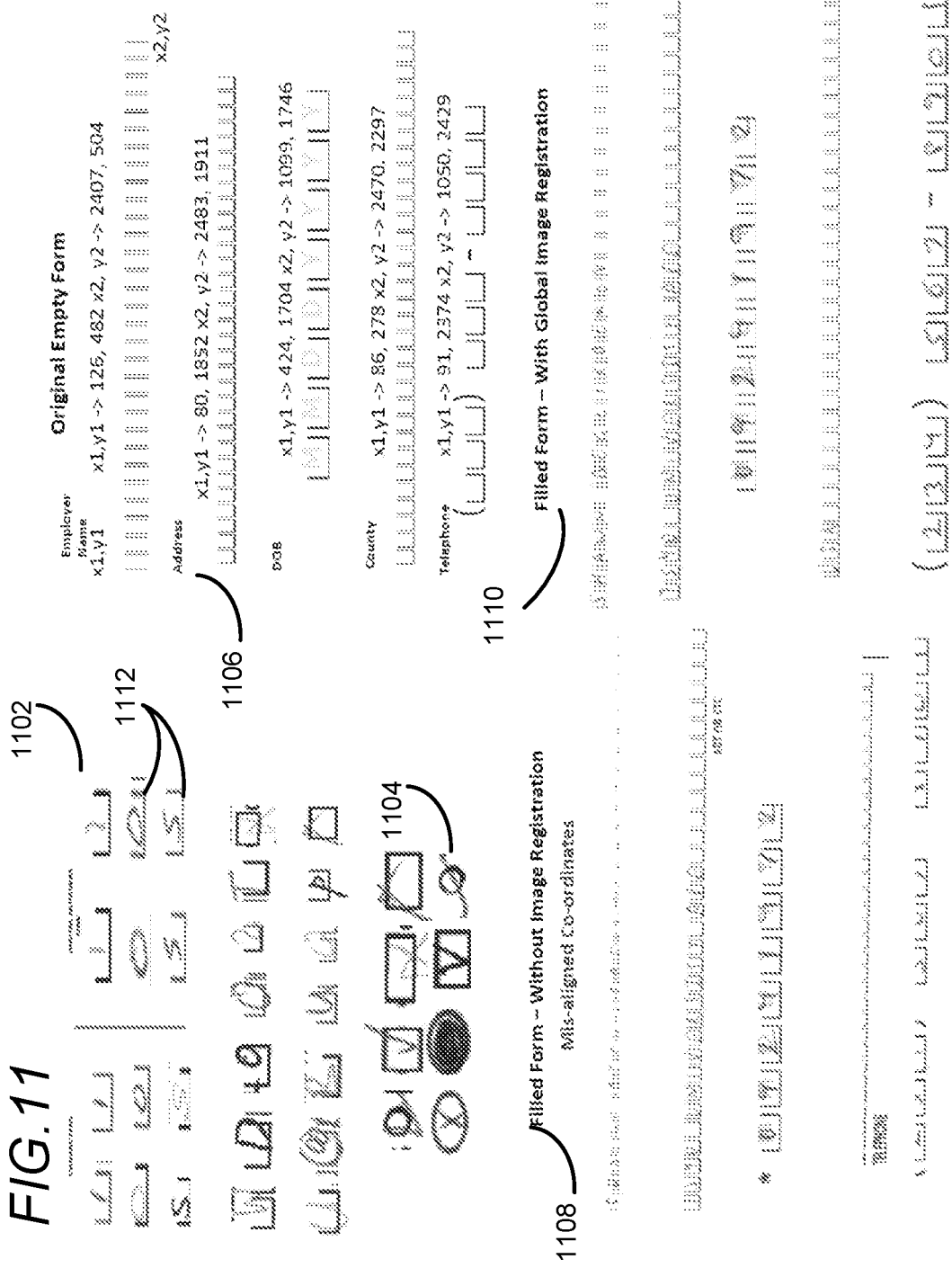
FIG. 11 shows some example errors that the document processing system is configured to fix far accurate data extraction in accordance with examples disclosed herein.

FIG. 11 shows some example errors that the document processing system 100 is configured to fix for accurate data extraction in accordance with examples disclosed herein. The image 1102 shows the various ways in which spacers, checkboxes, option buttons, etc., or other predetermined structures are filled by hand. Current commercial systems do not perform well for data extraction from forms having spacers 1112. Handwriting varies from person to person in style as well as neatness. Sometimes it can be difficult even for human reviewers to distinguish between alphabetical characters and digits. The written text often spills beyond the form boundaries thereby leading to poor legibility due to insufficient space, OCR tools are incapable of extracting information from checkboxes. Moreover, as seen in 1104, users may fill checkboxes in a variety of ways which can cause a machine to misread a form entry. Another image 1106 shows an empty form with the values of the top left (x1, y1) as (116, 482) and the bottom right corners (x2, y2) as (2407, 504) for the employer name field. Similarly, the top-left and the bottom-right coordinates for each of the address, Date of Birth (DOS), county, telephone, etc. are identified. The image 1108 shows a filled form without the global image registration. Due to the misaligned coordinates, the handwritten data is obscured thereby leading to failure of entity extraction in the absence of global image registration. When compensated for the scale, rotation, etc., via global image registration, the form fields can line up accurately with the handwritten data as shown in the image 1110 thereby enabling accurate entity extraction.

Figure 12:
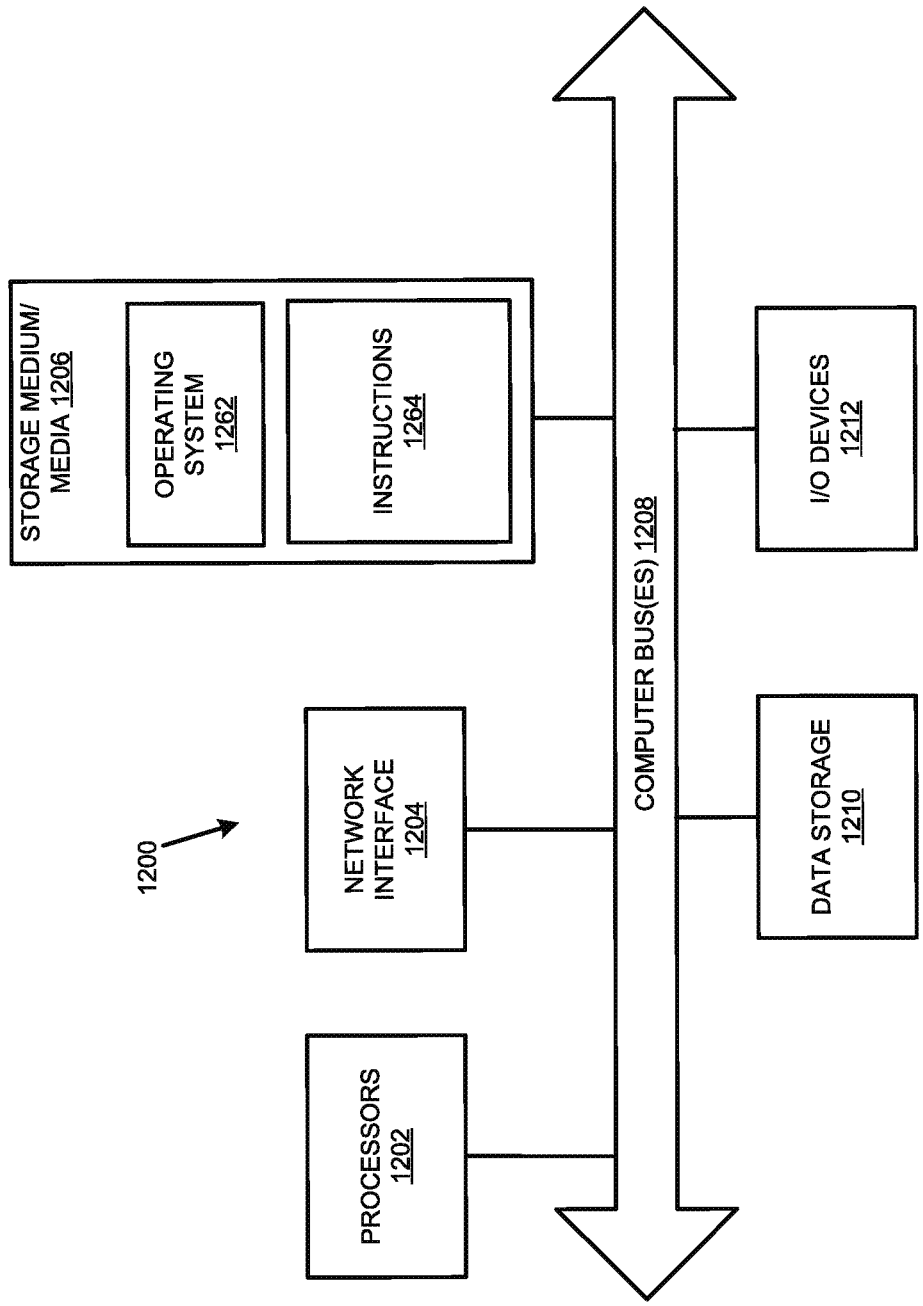
FIG. 12 illustrates a computer system that may be used to implement the document processing system in accordance with the examples disclosed herein.

FIG. 12 illustrates a computer system 1200 that may be used to implement the document processing system 100. More particularly, computing machines such as desktops, laptops, smartphones, tablets, and wearables which may be used to generate or access the data from the document processing system 100 may have the structure of the computer system 1200. The computer system 1200 may include additional components not shown and that some of the process components described may be removed and/or modified. In another example, a computer system 1200 can sit on external-cloud platforms such as Amazon Web Services, AZURE® cloud or internal corporate cloud computing clusters, or organizational computing resources, etc.

The computer system 1200 includes processor(s) 1202, such as a central processing unit, ASIC or another type of processing circuit, input/output devices 1212, such as a display, mouse keyboard, etc., a network interface 1204, such as a Local Area Network (LAN), a wireless 802.11x LAN, a 3G, 4G or 5G mobile WAN or a W Max WAN, and a processor-readable medium 1206. Each of these components may be operatively coupled to a bus 1208. The computer-readable medium 1206 may be any suitable medium that participates in providing instructions to the processors) 1202 for execution. For example, the processor-readable medium 1206 may be a non-transitory or non-volatile medium, such as a magnetic disk or solid-state non-volatile memory or volatile medium such as RAM. The instructions or modules stored on the processor-readable medium 1206 may include machine-readable instructions 1264 executed by the processor(s) 1202 that cause the processors) 1202 to perform the methods and functions of the document processing system 100.

The document processing system 100 may be implemented as software stored on a non-transitory processor-readable medium and executed by one or more processors 1202. For example, the processor-readable medium 1206 may store an operating system 1262, such as MAC OS, MS WINDOWS, UNIX, or LINUX, and code 1264 for the document processing system 100. The operating system 1262 may be multi-user, multiprocessing, multitasking, multithreading, real-time, and the like. For example, during runtime, the operating system 1262 is running and the code for the document processing system 100 is executed by the processor(s) 1202.

The computer system 1200 may include a data storage 1210, which may include non-volatile data storage. The data storage 1210 stores any data used by the document processing system 100. The data storage 1210 may be used to store the documents 150, the document images 152, the deep document trees 154, and other data that is used or generated by the document processing system 100 during operation.

The network interface 1204 connects the computer system 1200 to internal systems for example, via a LAN. Also, the network interface 1204 may connect the computer system 1200 to the Internet. For example, the computer system 1200 may connect to web browsers and other external applications and systems via the network interface 1204.

What has been described and illustrated herein is an example along with some of its variations. The terms, descriptions, and figures used herein are set forth by way of illustration only and are not meant as limitations. Many variations are possible within the spirit and scope of the subject matter, which is intended to be defined by the following claims and their equivalents.

What is claimed is:

1. A method of processing documents comprising:
   generating images corresponding to one or more documents wherein each image corresponds to one of the one or more documents that include forms with fields associated with predetermined structures having input data including one or more of typewritten and handwritten text therewithin;
   classifying each document of the one or more documents as at least one of a structured document and an unstructured document;
   selecting an optical character recognition (OCR) tool from a plurality of OCR tools for each document of the one or more documents,
      wherein the OCR tool is selected for each document based on the quality of document images and the classification of the document;
   extracting the input data as textual units from each document of the one or more documents using the OCR tool;
   further training a self-supervised, pre-trained model for input data extraction on a task-specific data set generated from unstructured documents in pre-training data,
      wherein the task-specific data set includes deep document trees corresponding to the unstructured documents in the pre-training data;
   building a deep document tree for each document of the one or more documents, wherein the deep document tree records locations of one or more of objects and the textual units within the document,
   wherein if at least one document of the one or more documents is classified as one of the structured documents,
      extracting the input data from the at least one structured document based on image alignment of the image corresponding to the at least one structured document with at least one of the stored templates;
   wherein if the at least one document is classified as an unstructured document,
      generating a graphical representation of the at least one unstructured document;
      extracting the input data from the at least one unstructured document by using the self-supervised model, wherein the self-supervised model extracts the input data based on the graphical representation;
   and
   providing at least a portion of the input data for execution of an automated process.

2. The method of claim 1, wherein building the deep document trees further comprises:
   identifying various objects included in the one or more documents; and discarding from further processing, non-textual objects in the one or more documents.

3. The method of claim 1, wherein extracting the input data from the at least one structured document based on the image alignment further comprises:
estimating projections for rotation, scale, and translation of features extracted from the at least one structured document.

4. The method of claim 1, wherein extracting the input data from the at least one unstructured document further comprises:
generating the graphical representation by:
identifying textual units of the at least one unstructured document as nodes;
connecting each of the nodes to at least four neighboring nodes;
and
providing the connected nodes to the self-supervised model.

5. A non-transitory processor-readable storage medium comprising machine-readable instructions that cause a processor to:
access one or more documents for processing, the one or more documents include forms with fields associated with predetermined structures having input data including one or more of typewritten and handwritten text therewithin, wherein the one or more documents include document images;
classify the one or more documents as at least one of the structured documents and unstructured documents;
select an optical character recognition (OCR) tool from a plurality of OCR tools for each document of the one or more documents,
wherein the OCR tool is selected for each document based on the quality of document images and the classification of the document;
extract the input data as textual units from each document of the one or more documents using a selected optical character recognition (OCR) tool, wherein the OCR tool is selected based on a quality of the document images and the classification of the document;
further train a self-supervised, pre-trained model for input data extraction on a task-specific data set generated from unstructured documents in pre-training data,
wherein the task-specific data set includes deep document trees corresponding to the unstructured documents in the pre-training data;
build a deep document tree for each document of the one or more documents, wherein the deep document tree records locations of one or more of objects and the textual units within the document,
wherein if at least one document of the one or more documents is classified as one of the structured documents,
extract the input data from the at least one structured document based on image alignment of the document images with one or more of the stored templates;
wherein if at least one document of the one or more documents is classified as an unstructured document,
generate a graphical representation of the at least one unstructured document;
extract the input data from the at least one document by using the self-supervised model, wherein the self-supervised model extracts the input data based on the graphical representation;
and
populate an output user interface (UI) with the input data extracted from the one or more documents.

6. The non-transitory processor-readable storage medium of claim 5, further comprising instructions that cause the processor to:
randomly mask data in training documents used for training the self-supervised model;
convert the masked documents into smaller images wherein each smaller image includes a textual unit of one of the masked documents;
obtain regions of interest in the training documents by providing the small images to the self-supervised model.

7. A document processing system, comprising:
at least one processor;
a non-transitory processor-readable medium storing machine-readable instructions that cause the processor to:
access one or more documents for processing, the one or more documents include forms with fields associated with predetermined structures having input data including one or more of typewritten and handwritten text therewithin, wherein the one or more documents include document images;
determine a quality of the document images in the one or more documents;
classify the one or more documents as at least one of the structured documents and unstructured documents;
select an optical character recognition (OCR) tool from a plurality of OCR tools for each document of the one or more documents,
wherein the OCR tool is selected for each document based on the quality of document images and the classification of the document;
extract the input data as textual units from each document of the one or more documents using the selected optical character recognition (OCR) tool;
further train a self-supervised, pre-trained model for input data extraction on a task-specific data set generated from unstructured documents in pre-training data,
wherein the task-specific data set includes deep document trees corresponding to the unstructured documents in the pre-training data;
build a deep document tree for each document of the one or more documents, wherein the deep document tree records locations of one or more of objects and the textual units within the document,
wherein if at least one document of the one or more documents is classified as one of the structured documents,
identify a matching template for the at least one structured document from a plurality of stored templates;
extract the input data from the at least one structured document based on image alignment of the document images with the matching template;
wherein if at least one document of the one or more documents is classified as an unstructured document,
generate a graphical representation of the at least one unstructured document;
extract the input data from the at least one unstructured document by using the self-supervised model, wherein the self-supervised model extracts the input data based on the graphical representation;
and
populate an output user interface (UI) with the input data extracted from the one or more documents.

8. The document processing system of claim 7, wherein to extract the input data including the textual units from the one or more documents the processor is to further:
- identify one or more objects from the one or more documents by employing object detection techniques, wherein the objects include one or more of figures, logos, equations, signatures, and tables;
- disregard the one or more objects from further processing; and
- process textual portions of the one or more documents via the selected OCR tool to generate the textual units.

9. The document processing system of claim 8, wherein to build the deep document tree for each of the one or more documents, the processor is to further:
- determine locations of the objects and the textual portions within the at least one document using bounding box coordinates; and
- build the deep document tree based on the locations of the objects and the textual portions.

10. The document processing system of claim 7, wherein the processor is to further:
- determine locations of the fields on the one or more documents based on a corresponding deep document tree of each of the one or more documents.

11. The document processing system of claim 7, wherein the at least one document includes a form with spacers filled with handwritten text.

12. The document processing system of claim 7, wherein to identify the matching template, the processor is to further:
- extract features of the document images from the one or more documents, wherein the features include texture-level features and pixel-level features.

13. The document processing system of claim 12, wherein to identify the matching template, the processor is to further:
- determine similarities of the features extracted from the one or more documents with features of each of the stored templates.

14. The document processing system of claim 7, wherein to extract the input data from the at least one structured document based on image alignment of the document images, the processor is to:
- determine top-left coordinates and bottom-right coordinates of the predetermined structures within one of the stored templates that match the at least structured one document;
- render the top-left coordinates and the bottom-right coordinates on corresponding predetermined structures of the at least one document; and
- identify misaligned coordinates from the rendering.

15. The document processing system of claim 14, wherein to extract the input data from the at least one structured document based on image alignment of the document images, the processor is to:
- identify points of interest and descriptors of the matching stored template in non-linear scale space invariant to scale, rotation and translation;
- select best matching features from the points of interest and the descriptors; and
- estimate projections of the scale, the rotation, and the translation.

16. The document processing system of claim 15, wherein to extract the input data from the at least one structured document based on image alignment of the document images, the processor is to:
- warp the at least one structured document so that it aligns with the matching stored template; and
- identify one or more of the typewritten or handwritten data using text recognition model.

17. The document processing system of claim 7, wherein to generate the graphical representation of the at least one unstructured document, the processor is to:
- build nodes of the graphical representation wherein each of the nodes includes each of the textual units connected via edges to nearest neighbors.

18. The document processing system of claim 17, wherein to extract the input data from the at least one unstructured document based on the graphical representation, the processor is to:
- predict the textual units by employing a masked visual language model for processing text and position embeddings from the deep document tree and image embeddings.

19. The document processing system of claim 18, wherein the masked visual language model includes an image embedding layer based on Rotational Region Convolution Neural Network (R2CNN).

20. The document processing system of claim 7, wherein the processor is to further:
- improve the quality of the document images if it is determined that the document images are of low quality.

* * * * *